METHOD AND APPARATUS FOR WRITING INFORMATION INTO PLATED WIRE MAGNETIC FILM MEMORIES

Filed Aug. 16, 1966 2 Sheets-Sheet 1

INVENTORS.
ETSUO KASHIWAGI
HIROSHI MURAKAMI
BY
Ostrolenk, Faber, Gerb & Soffen
ATTORNEYS INVENTORS.
ETSUO KASHIWAGI
HIROSHI MURAKAMI
BY
Ostrolenk, Faber, Gerb & Soffen
ATTORNEYS United States Patent Office 3,478,336

Patented Nov. 11, 1969

3,478,336

METHOD AND APPARATUS FOR WRITING INFORMATION INTO PLATED WIRE MAGNETIC FILM MEMORIES

Etsuo Kashiwagi and Hiroshi Murakami, Tokyo, Japan, assignors to Nippon Electric Company Limited, Tokyo, Japan Filed Aug. 16, 1966, Ser. No. 572,722
Claims priority, application Japan, Aug. 31, 1965, 40/53,194
Int. Cl. G11b 5/74
U.S. Cl. 340—174 5 Claims

ABSTRACT OF THE DISCLOSURE

A memory system employing cylindrical shaped memory elements comprised of a rod-shaped conductor having a ferromagnetic coating upon its outer surface. A single turn winding is disposed about the cylindrical shaped memory element. Pulses of opposite polarity are applied to the winding and substantially simultaneously therewith an information pulse is applied to the rod shaped conductor timed so as to be initiated prior to the termination of the first pulse applied to the winding and so as to terminate subsequent to the second pulse of opposite polarity applied to the winding so as to enable a reduction in the level of information current amplitude utilized to drive such elements while maintaining suitable margins of operation.

The instant invention relates generally to writing methods and apparatus for cylindrical magnetic film memories, and more particularly to a new and improved writing method and apparatus for such memories which is capable of substantially increasing the allowable margin information pulse amplitudes; that is, lowering the magnitude or level of the minimum input information pulse amplitude, and accordingly, enhancing the reliability of cylindrical magnetic film memory elements which are presently produced through the use of conventional manufacturing techniques.

Whereas the description set forth in the instant specification is primarily concerned with a novel writing or driving method for plated wire memory elements, it should be obvious to one having ordinary skill in the technology involved here that the new writing method and apparatus is equally applicable to the planar magnetic film memory elements. Therefore, the description set forth herein should be construed to be of sufficient breadth as to encompass both types of memory elements or memory devices as a matter of course, while no specific mention is made of planar film magnetic memory elements.

Whereas it is not difficult to provide usable magnetic properties in magnetic film memories produced in accordance with conventional technological developments in individual cylindrical film memory elements (when considering allowable limits for the word pulse or the information pulse magnitudes), the technique for quantity production of memory elements having substantially uniform magnetic characteristics at high yield rates has still remained to be resolved as a most difficult problem confronting present-day technology.

Various technical suggestions have been proposed, and some have been reduced to practice in the technological field of plated wire magnetic film memories in order to effectively utilize individual memory elements in magnetic film memory devices irrespective of the presence of considerably non-uniform magnetic characteristics among the devices produced and thereby for enhancing the operational reliability of such plated wire memory devices.

The principal objective of the instant invention is to provide a solution to this problem through the employment of a new and improved driving or writing method and apparatus capable of greatly increasing the usable margins of both word and information pulse amplitudes or cutting down the level of the minimum information current amplitude which may be used in driving magnetic film memory elements.

The writing method and apparatus according to the instant invention may be employed in any memory plane comprised of a plurality of memory elements, each of which includes a conducting substrate wire for conducting an information current pulse, a cylindrical magnetic film continuously electroplated on the conducting substrate wire and having an easy axis of magnetization in the circumferential direction; and a word line disposed substantially perpendicularly to the substrate wire for the purpose of conducting a word current pulse.

An outstanding feature of the writing method of the instant invention over conventional techniques is that the binary information states ONE and ZERO are written into the cylindrical magnetic film by introducing the information current pulse before the cessation of the word pulse and, for some time after the cessation of the word pulse, and further introducing an auxiliary word pulse opposite in polarity to the regular word pulse in the word line in the time interval between the cessation of the regular word pulse and that of the information pulse.

This write-in method causes a reversal of substantially all those atoms magnetized in the binary ZERO (or binary ONE) state to reverse to the binary ONE (or binary ZERO) state which constitutes a significantly greater reversal from the viewpoint of the number of atoms reversed than that which occurs during conventional write-in operation.

It is, therefore, one object of the instant invention to provide a novel write-in method for cylindrical and planar film magnetic memory devices in which an initial and an auxiliary current pulse are introduced into the word pulse line during the write-in operation.

Another object of the instant invention is to provide a novel write-in method for cylindrical and planar film magnetic memory devices in which an initial and an auxiliary current pulse are introduced into the word pulse line during the write-in operation wherein the timing relationships between the current pulses introduced into the word line and the information current pulse introduced into the substrate wire are such that the information pulse is introduced before the cessation of the first word pulse and subsists for some time after the cessation of the word pulse, and wherein the auxiliary word pulse is opposite in polarity to the first word pulse and occurs in the time interval between the cessation of the first word pulse and the cessation of the information pulse.

These and other objects of the instant invention will become apparent when reading the accompanying description and drawings, in which.

Figure 3A:
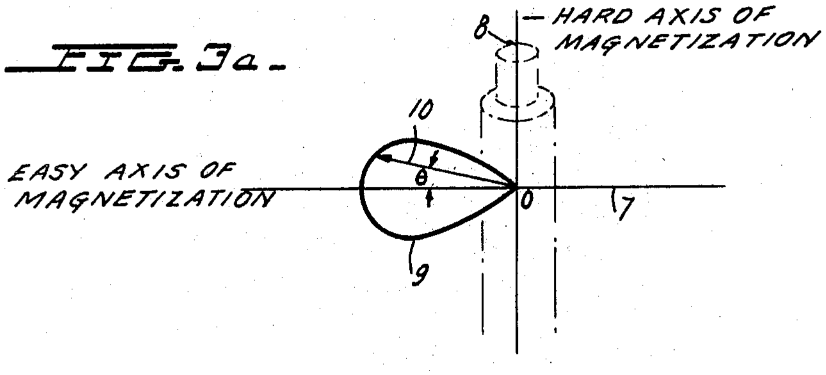
Figure 3B:
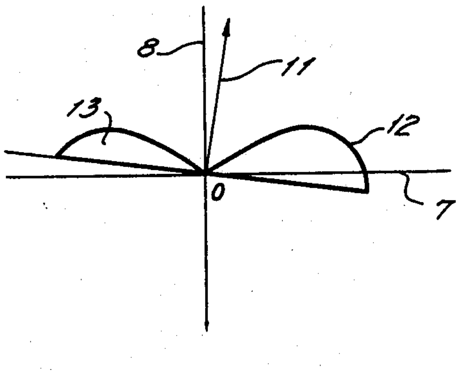
Figure 3C:
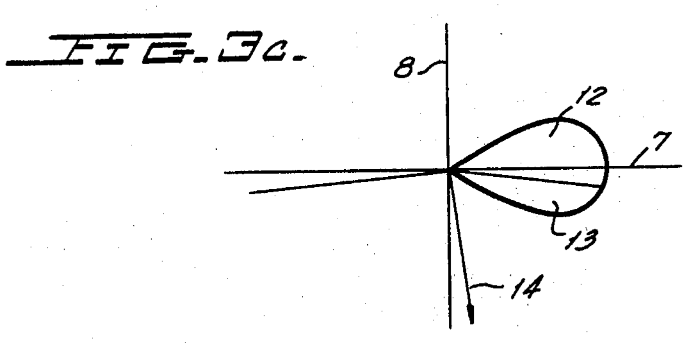

FIGURES 3*a*, 3*b* and 3*c*, respectively, are polar coordinate diagrams presented to facilitate an understand of the principles of this invention.

Figure 4:
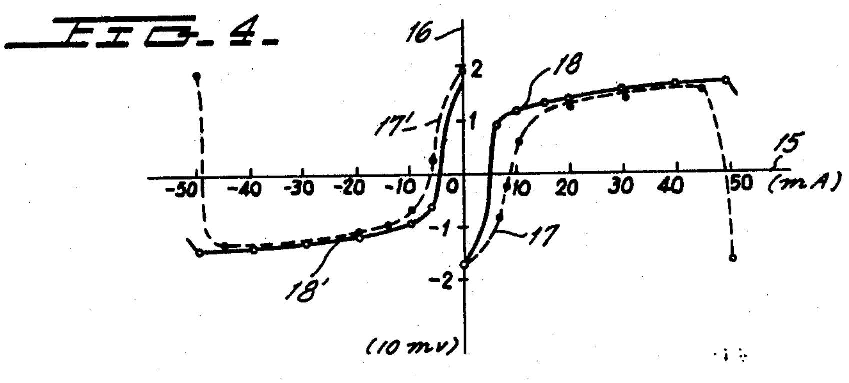

FIGURE 4 is a plot of curves derived from experimental data obtained through the use of a cylindrical magnetic film memory, typically referred to as a plated wire memory, in order to illustrate the advantages of the the writing method of the instant invention as compared with conventional writing methods.

Figure 1:
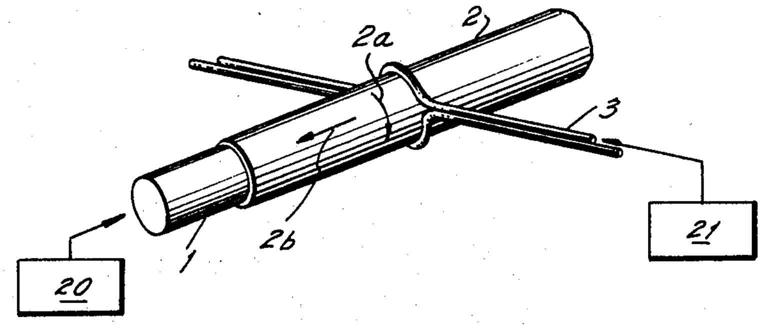
FIGURE 1 is a perspective view showing a conventional cylindrical film memory element which may be employed with the novel method of the instant invention.

FIGURE 1 shows a perspective view of the components employed in a conventional cylindrical magnetic film memory element which may be utilized with the writing method of the instant invention. The arrangement of FIGURE 1 is comprised of a conducting substrate wire 1 formed preferably of either copper or phosphorbronze. The magnetic film 2 is continuously electroplated on the wire circumferential surface. A word line 3, in the from of a single-turn solenoid, is disposed around substrate wire 1 so as to be aligned substantially perpendicular to wire 1.

In the arrangement of FIGURE 1, the easy and hard axes of magnetization of magnetic film 2 are respectively formed in the circumferential 2*a* and axial 2*b* directions of substrate wire 1.

With this arrangement, a uniaxial magnetic anisotropy is introduced into the magnetic film 2 to result in the two directions of magnetization, either clockwise or counterclockwise around the wire circumference. The two magnetization directions are used to represent binary information states wherein a binary ONE state is chosen as the clockwise direction and the binary ZERO state as the counterclockwise direction, or vice versa, depending only upon the choice of the user.

Figure 2:
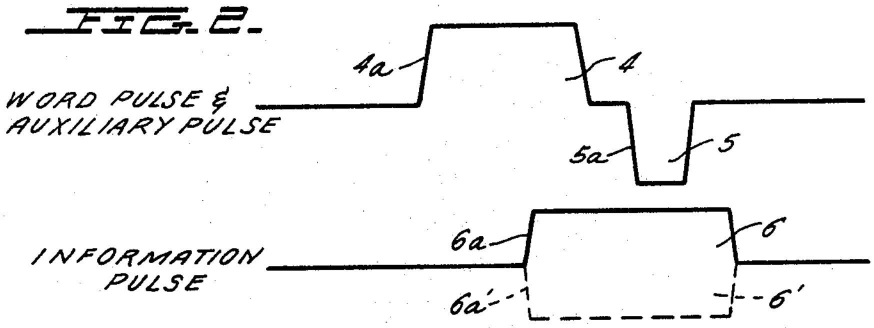
FIGURE 2 is a waveform diagram showing typical current pulse waveforms and illustrating the time relationship among various pulses to be conducted in the memory element of FIGURE 1 in accordance with the writing method of the instant invention.

FIGURE 2 shows typical current pulse waveforms which illustrate the concept of the writing method according to the instant invention. It is conventional, in the field of plated wire memory elements, to read out binary information which has been written into the magnetic film at the leading edge 4*a* of a word pulse current which is introduced into word line 3 and to write binary information therein by introducing an information pulse 6 (or 6') in the conducting substrate wire 1 which corresponds to a binray ZERO (or binary ONE) in such a manner that the leading edge 6*a* (or 6*a'*) of the information pulse is initiated before the cessation of the word pulse 4 and which sustains for a time interval after the cessation of the word pulse 4.

The writing method of the instant invention differs from the conventional writing method in that an auxiliary word pulse 5, as shown in FIGURE 2, is provided in addition to the ordinary word pulse 4. The auxiliary word pulse 5 is opposite in polarity to the regular word pulse 4, and the auxiliary word pulse 5 is introduced in the time interval between the cessation of both the regular word pulse 4 and the information pulse 6 (or 6') for the purpose of lowering the allowable minimum information pulse amplitude of the information pulse current 6 (or 6') introduced into the conducting substrate wire 1.

Although the auxiliary word pulse 5 and the regular word pulse 4 are shown as having substantially the same amplitudes, this illustration is simply by way of example, and, it should be understood, that the "equal amplitude" pulse relationship is by no means a necessary condition for producing a successful writing operation according to this invention.

FIGURE 3*a* is a plot showing a polar coordinate system which serves as an aid toward understanding the principles of the writing method according to this invention. Such polar coordinates are also depicted in the form of similar graphs shown in FIGURES 3*b* and 3*c*, to be more fully described.

FIGURE 3*a* represents the magnetization state of a memory region in the cylindrical magnetic film possessing an anisotropic dispersion and assumes a binary ONE (or binary ZERO) has been perfectly written in the magnetic film 2.

Considering FIGURE 3*a*, the mean easy and hard axes of magnetization are respectively in alignment with the ordinate and abscissa of the FIGURE 3*a* plot. Stated more particularly, the loop 9 defines an area which represents a density function indicative of the normalized ratio of Ni-Fe alloy atoms (forming the magnetic film) which have an easy axis of magnetization in a direction aligned at an angle $\theta$ with the mean easy axis of magnetization 7 relative to the total Ni-Fe alloy atoms as depicted by the radius vector 10. The reference numeral 8 denotes the hard axis of magnetization. It can be seen to be obvious that this graph illustrates the case in which the mean easy and hard axes of magnetization coincide respectively with the circumferential and axial directions 2*a* and 2*b* of magnetic film 2.

Incidentally, it is well known that the switching threshold regarding the writing operation, or the amplitude relationship between the word and information pulses employed in the writing operation normally follow an "astroid" curve.

The polar diagram shown in FIGURE 3*b* illustrates the magnetization reversal state of the memory region in the magnetization state as expressed by loop 9 in FIGURE 3*a* which is obtained by a writing operation (according to the conventional method) wherein a binary ZERO (or binary ONE) is written into the region of the magnetic film using the resultant magnetic field 11 in the film—that is, by introducing a word pulse into word line 3 and an information pulse into the conducting substrate wire 1 having an amplitude which is less than the minimum value necessary for perfectly writing a binary ZERO (or binary ONE) in the memory region. This imperfect writing operation results in the mean easy and hard axes of magnetization being aligned at an angle relative to the perfect mean easy and hard axes of magnetization.

Of the two loops shown in FIGURE 3*b*, the loop 12 defines an area corresponding to the number of atoms for which the magnetization reversal has occurred, whereas the area defined by loop 13 represents an area corresponding to the remaining number of atoms for which no magnetization reversal has occurred. It can clearly be seen from a consideration of FIGURE 2*b* that a substantial number of atoms fail to undergo a magnetization reversal.

FIGURE 3*c* illustrates the magnetization reversal state for the same memory region considered in conjunction with the polar diagrams of FIGURES 3*a* and 3*b* and which is obtained by the novel writing method described herein. The graph of FIGURE 3*c* may best be understood by analyzing the writing operation which may be divided into two successive operations as follows:

The first operation constitutes the magnetization reversal state occurring under control of a write-in operation as the result of the magnetic field 11 in the magnetic film which is produced by a word pulse 4 and an information pulse having the same amplitude as that of information pulse 6 which has been referred to in explaining the polar diagram of FIGURE 3*b*. This operation results in the polar diagram of FIGURE 3*b*.

Now, considering the writing operation as including the additional operation of producing a resultant magnetic fluid 14 generated by the auxiliary word pulse 5 and the above mentioned information pulse 6, it is found that magnetization reversal also occurs, as shown by the loop defining area 13' which includes the atoms corresponding to area 13 in polar diagram FIGURE 3*b* that have failed to perform the magnetization reversal in the process employed in FIGURE 3*b*.

From the foregoing description, it can be readily understood that the margin of the information current pulse for the magnetic film can be greatly increased, and the write-in characteristics of the memory element can be greatly improved when employing the principles of the instant invention.

If rotational vector diagrams similar to those shown in FIGURE 3 were considered, it would not be difficult to conclude that the allowable range of information current can be greatly increased, and this effect accomplished when a binary ONE (or binary ZERO) is written into the magnetic film, provided that the magnetic film possesses a "skew" (that is, where the direction of the hard axis of magnetization of the film deviates from the axial direction of the substrate wire by some angle), in the case where the magnetic film does not possess an "anisotropy dispersion."

FIGURE 4 is a plot showing experimental data which was compiled using the memory plane employing the memory element components of FIGURE 1 in order to show a comparison between the conventional and the improved writing methods.

Each of the memory elements in the memory plane consisted of a substrate wire 1 having a diameter of 0.20 mm. with a magnetic film electroplated thereon having a thickness of 1 micron. A three-turn solenoid-type word line was disposed around the plated wire so as to be aligned substantially perpendicular to substrate 1. The solenoid-type word lines had a diameter of 0.10 mm. and the solenoid-type word lines were provided with a suitable insulation. The memory plane was arranged with a plurality of substrate wires 1 being disposed in spaced parallel fashion so that on-center distances between substrate wires were 1.50 mm. A plurality of word lines were disposed in spaced parallel fashion so that their on-center distances were 2.0 mm. The coercive force, the uniaxial anisotropy field strength, and the dispersion angle of the film were respectively 1.7 oersteds, 2.6 oersteds, and approximately 2 degrees.

In FIGURE 4, readout signal level and information pulse amplitudes are respectively plotted along the ordinate 16 and the abscissa 15.

Curve 17 is a plot relating the relationship between readout signal level and information pulse amplitude of a memory elements after it has been subjected to the following process:

CASE NO. 1

A binary ZERO was written once into the magnetic film by use of the conventional writing method subsequent to the time in which a binary ONE had been written a large number of times into the same memory element by the conventional method. The written-in region was then subsequently subjected to disturbance a large number of times by information pulses for ONE's, each having the same amplitude as that of the information pulse used to write the binary ZERO.

Curve 17' shows the relationship between readout signal voltage level and information pulse amplitude current of a memory element after it has been subjected to the following processes:

CASE NO. 2

A binary ONE was written into the memory element once by the conventional writing method subsequent to the time in which a binary ZERO had previously been written a large number of times by the use of the conventional method. Then the written-in region was disturbed a large number of times by many information pulses for ONE's, each having the same current amplitude as that of the information pulse used for writing the binary ONE.

Curve 18 shows the relationship between readout signal level and information pulse amplitude of a memory element after it has been subjected to a process similar to that detailed in Case No. 1 using the improved writing method in place of the conventional writing method.

Curve 18' shows the relationship between readout signal level and information pulse amplitude current of a memory element after it has been subjected to a process similar to that detailed in the above mentioned Case No. 2 wherein the improved writing method has been substituted for the conventional writing method.

Operating conditions under which the above experiments were performed with the memory plane were as follows:

| | |
|---|---|
| Word pulse amplitude | 0.6 amp. |
| Word pulse duration | 0.15 μsec. |
| Auxiliary pulse amplitude | 0.6 amp. |
| Auxiliary pulse duration | 0.06 μsec. |
| Time interval between cessation of regular word pulse and commencement of auxiliary word pulse | 0.04 μsec. |
| Information pulse amplitude | Varied from 0 to 55 mA discretely. |
| Information pulse duration | 0.3 μsec. |
| Time interval between commencement of regular word pulse and that of information pulse | 0.1 μsec. |

Numerical values obtained by this experiment are listed in Table 1.

| Information Pulse Amplitude, mA. | Readout signal level in mV. taken under similar situations as mentioned in Case No. 1 | | Readout signal level in mV. taken under similar situations as mentioned in Case No. 2 | |
|---|---|---|---|---|
| | When the improved writing method was used, mV. | When the conventional writing method was used, mV. | When the improved writing method was used, mV. | When the conventional writing method was used, mV. |
| 0 | −18.0 | −19.5 | +19.5 | +19.0 |
| 5 | +3.0 | −12.5 | −3.0 | +7.8 |
| 6 | +8.3 | −8.8 | −5.5 | +4.0 |
| 8 | +11.0 | +2.5 | −7.7 | −5.0 |
| 10 | +11.8 | +7.0 | −8.0 | −7.5 |
| 15 | +13.0 | +12.0 | −11.0 | −10.0 |
| 20 | +14.0 | +13.0 | −12.0 | −11.0 |
| 25 | +15.0 | +13.8 | −12.5 | −11.7 |
| 30 | +15.5 | +14.8 | −13.0 | −12.0 |
| 40 | +15.5 | +15.6 | −14.0 | −13.0 |
| 45 | +17.0 | +16.0 | −14.0 | −13.0 |
| 50 | +17.0 | −17.0 | −14.5 | −14.0 |
| 55 | −18.8 | −17.8 | −19.5 | +18.0 |

It should be evident that a memory element into which a binary ZERO (or binary ONE) was written a large number of times and then subsequent thereto a binary ONE (or binary ZERO) was written once represents the "worst condition" which can occur within a memory element because the margin of the information pulse becomes minimum under this condition irrespective of the type of writing method employed.

Thus, by considering the operating characteristics of a memory element under the "worst conditions," it goes without saying that the operating conditions other than the worst conditions need not be taken into consideration since such other operating conditions will always yield better output results for a given driving condition.

As will be readily understood from the foregoing explantation, the origin of information pulse amplitudes which are permissible for use in operating a plated wire memory device are substantially increased through the use of the improved writing methods set forth herein, and, accordingly, the margins of the word pulses can likewise be greatly increased to a certain extent corresponding to the increases in information pulses.

Since the storage capacity and hence the reliability of plated wire memory devices are vastly improved through the writing method described herein, the successful yields of memory elements produced in the manufacturing process are appreciably raised, thus affording the writing method of the instant invention a great deal of practical utility.

Whereas the exemplary embodiment of the instant invention has been assumed to employ a pulse timing diagram such as that shown in FIGURE 2 wherein an information pulse is shown to be a continuous single pulse, it should be likewise understood that two separate information pulses arranged in whatever manner may be introduced in lieu of a single continuous pulse so long as the two information pulses conform to the timing relationships set forth below:

A first information pulse should be initiated before the cessation of the regular word pulse and be terminated during the time interval between the cessation of the regular word pulse and the initiation or commencement of the auxiliary word pulse. The second information word pulse should be initiated before the commencement or cessation of the auxiliary word pulse and be sustained for some time interval after the cessation or termination of the auxiliary word pulse.

It will be apparent from the foregoing explanation that the effect of the improved writing method according to the instant invention remains the same in the particular arrangement set forth above.

The means employed to produce the information pulse into substrate wire 1 may be any conventional means employed to operate plated wire memory devices. The means employed to produce the regular word pulse and auxiliary word pulse may be any conventional means available in the electronic art which is capable simply of producing two consecutive pulses opposite in polarity and substantially but not absolutely equal in amplitude. The information pulse generator 20, shown in FIGURE 1, may be any suitable square pulse generating means such as, for example, a one-shot multivibrator. The word pulse generator 21 may, for example, be a one-shot multivibrator producing a substantially square pulse and having a differentiation circuit coupled to the output thereof so as to produce successive positive and negative going pulses obtained through differentiation of a single positive going pulse. The above choices should be considered as being merely exemplary and any other suitable electronic circuits may be employed, depending only upon the needs of the user. Such suitable pulsing and digital techniques are set forth in many engineering texts such as, for example, "Pulse and Digital Circuit Techniques" by Millman and Taub, copyright 1957 by McGraw-Hill.

Although this invention has been described with respect to its preferred embodiments, it should be understood that many variations and modifications will now be obvious to those skilled in the art, and it is preferred, therefore, that the scope of the invention be limited not by the specific disclosure herein but only by the appended claims.

What is claimed is:

1. A method for writing binary information into a plated wire magnetic film memory device comprised of a plurality of spaced parallel cylindrical magnetic film memory elements, each consisting of a conducting substrate wire, a thin magnetic film continuously electroplated thereon and having an easy axis of magnetization in the circumferential direction of said conducting substrate wire, and a plurality of spaced parallel solenoid-form word drive lines disposed around each of the plated wire substrates so as to be substantially perpendicularly aligned to said plated wires, characterized in that the binary information states ONE and ZERO are written into said memory by sequentially introducing regular and auxiliary word pulses in said word line and an information pulse in said conducting substrate wire so as to meet the following timing relations:

(a) a regular word pulse followed by an auxiliary word pulse opposite in polarity to said regular word pulse is selectively introduced into said word drive lines;

(b) an information pulse is selectively introduced into said substrate wires substantially before the cessation of the regular word pulse and is terminated after the cessation of the regular word pulse;

(c) and the auxiliary word pulse which is opposite in polarity to the regular word pulse is introduced in the time interval between the cessation of the regular word pulse and the cessation of the information pulse.

2. The method of claim 1 wherein the step of introducing the regular word pulse is further comprised of producing a word pulse of positive polarity.

3. The method of claim 2 wherein the step of producing an auxiliary word pulse is further comprised of producing a word pulse which is of negative polarity.

4. The method of claim 3 wherein said regular and auxiliary word pulses are opposite in polarity and of substantially equal amplitude.

5. A plated wire magnetic film memory comprising:

a plurality of spaced parallel cylindrical magnetic film memory elements, each consisting of a conducting substrate wire, a thin magnetic film continuously electroplated thereon and having an easy axis of magnetization in the circumferential direction of said conducting substrate wires;

a second set of spaced parallel solenoid-form word drive lines disposed around each of the plated wire substrates so as to form one turn therearound, wherein said set of word drive lines are aligned substantially perpendicularly to said substrate wires;

first means for selectively generating an information current pulse in said substrate wires;

second means for selectively introducing a regular word pulse current followed by an auxiliary word pulse current in said word drive lines;

said second means being comprised of means for generating a positive going regular word pulse followed by a negative going auxiliary word pulse with the timing relationships among the pulses being such that the information pulse in initiated before the termination of the regular word pulse and is terminated after the termination of the regular word pulse, and the auxiliary word pulse is initiated in the time interval between the termination of the regular word pulse and the termination of the information pulse.

References Cited

Bittmann, E. E.: Thin Film Memories, International Solid-State Circuits Conference, Feb. 12, 1959; pp. 22–23.

BERNARD KONICK, Primary Examiner

G. M. HOFFMAN, Assistant Examiner